United States Patent Office 3,150,833
Patented Sept. 29, 1964

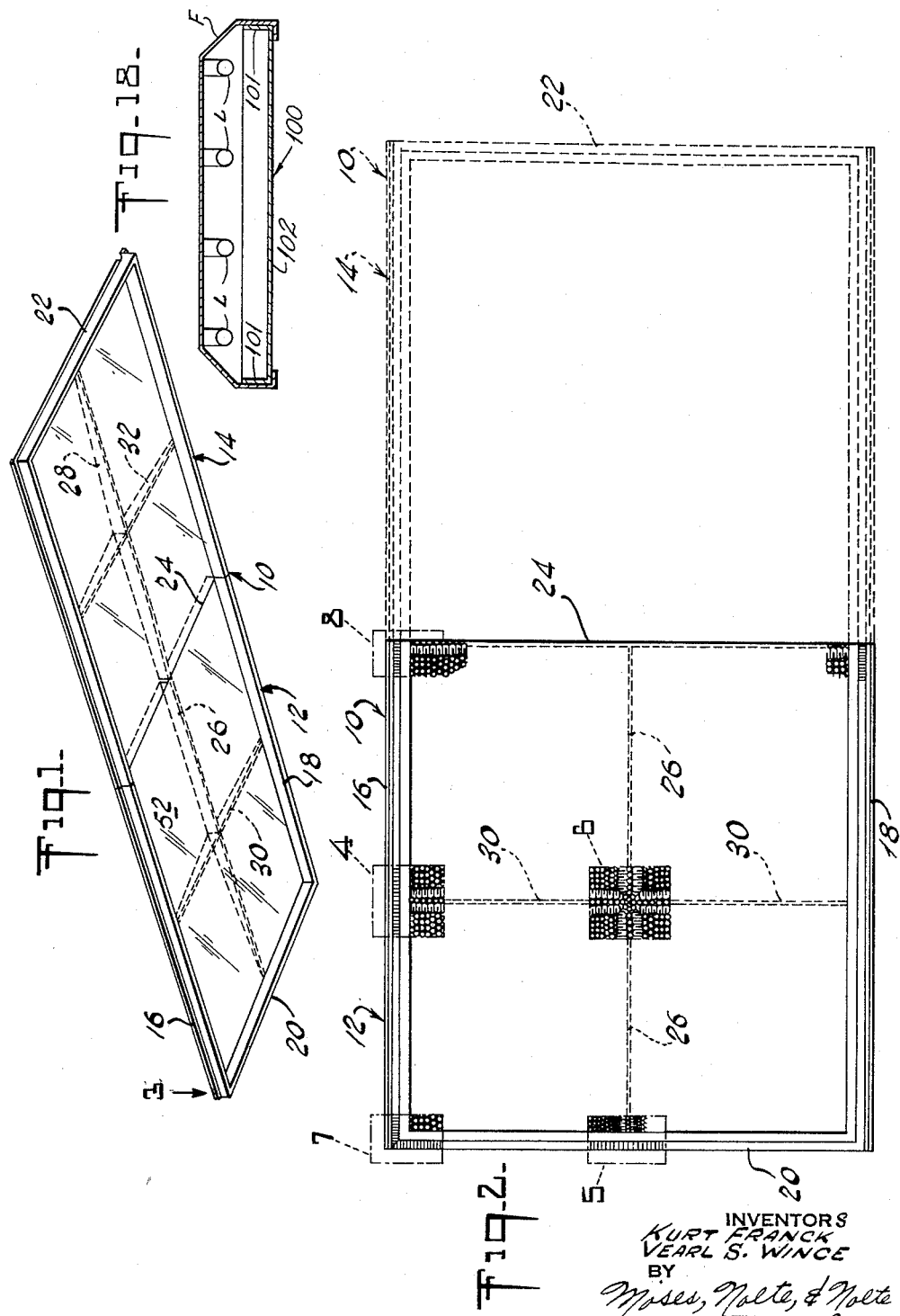

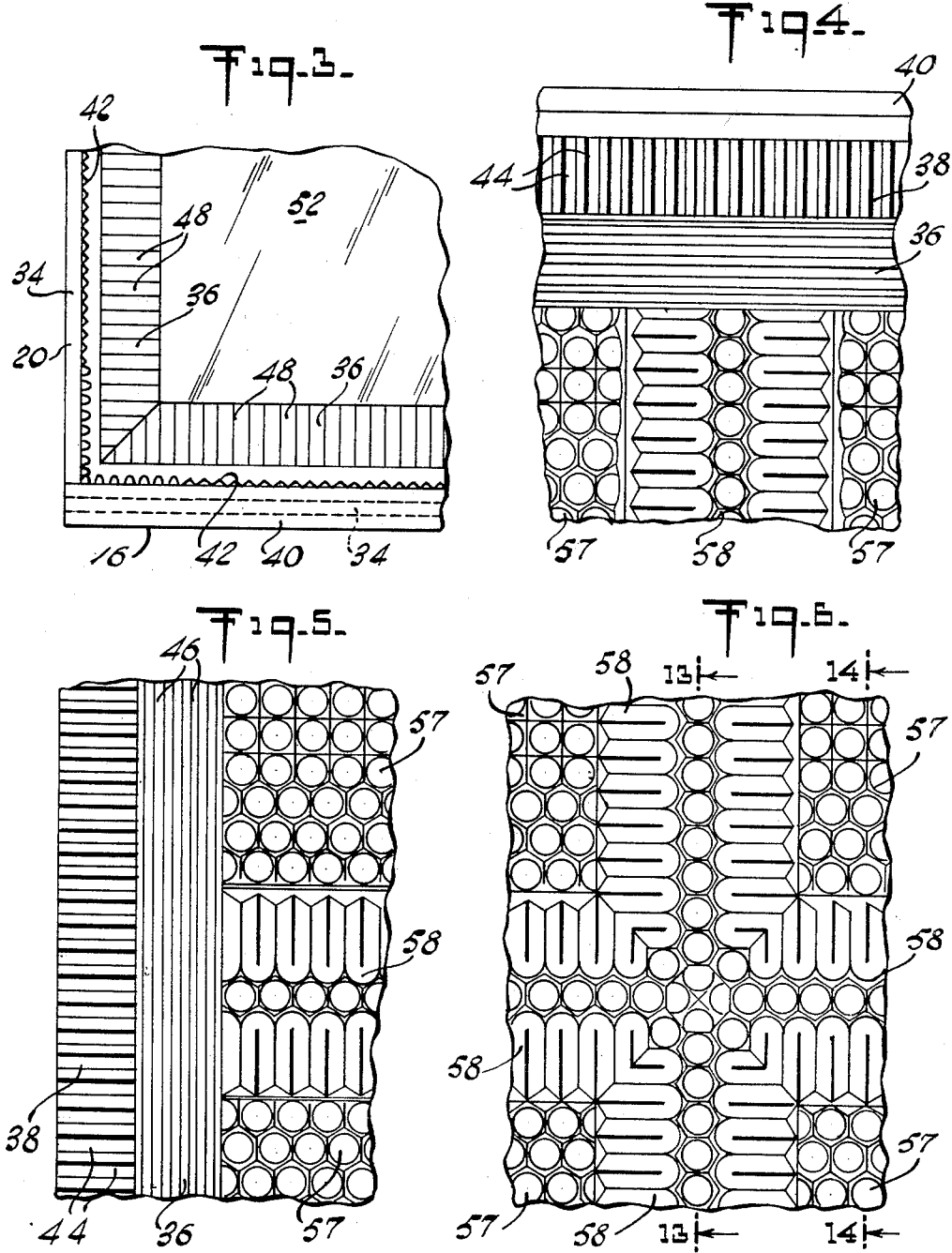

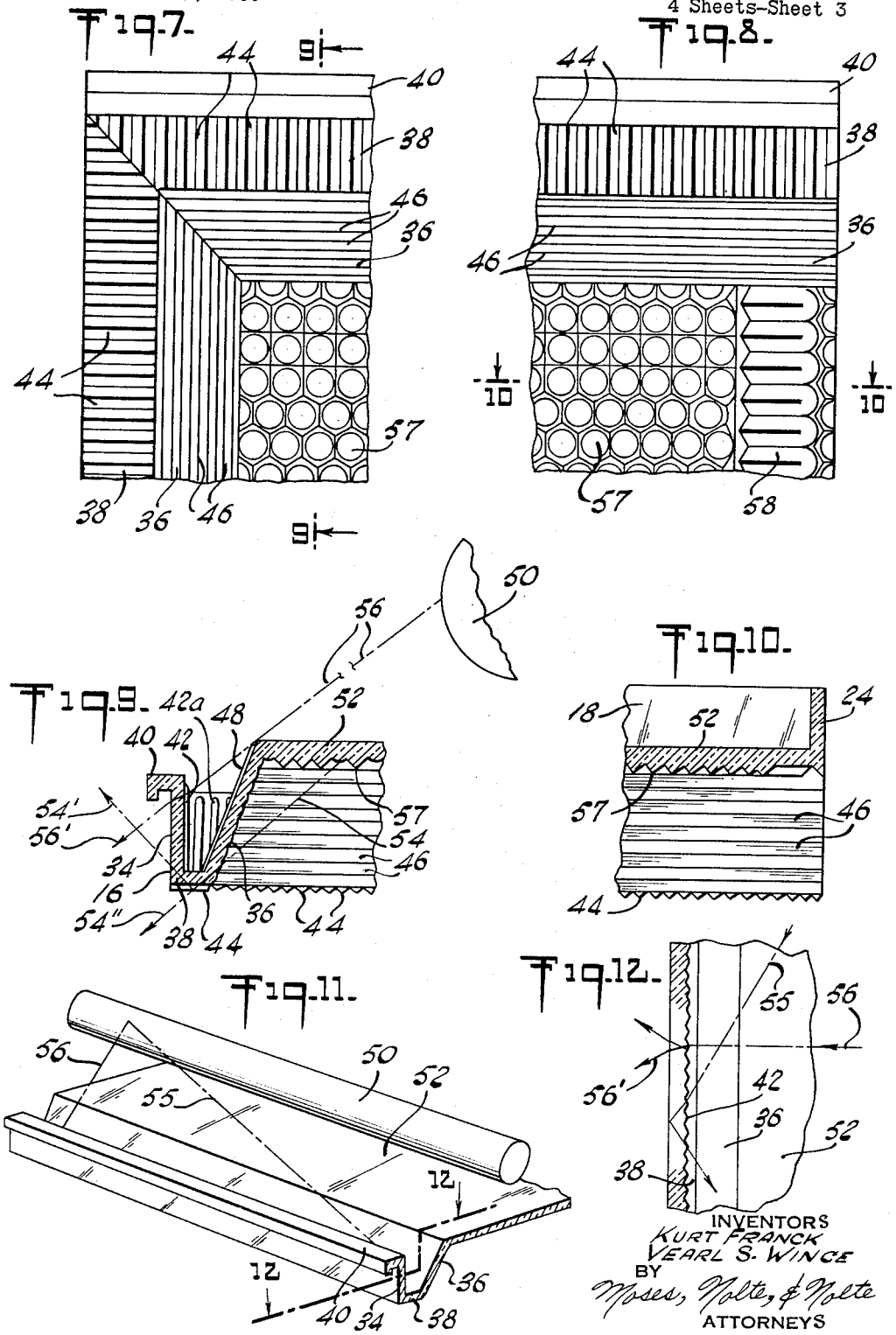

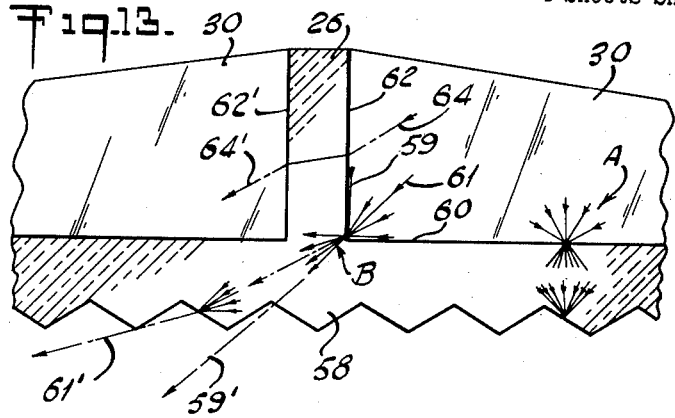
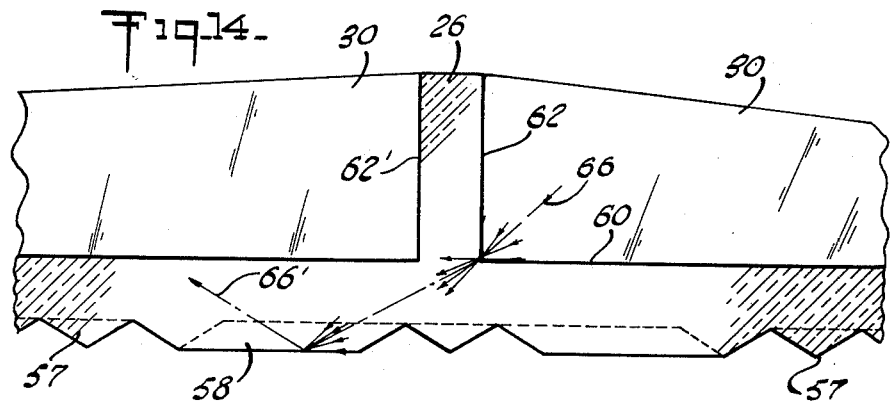
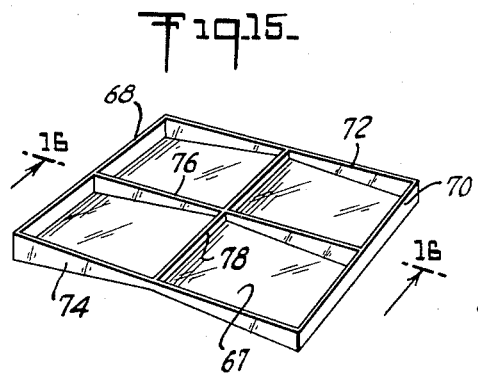
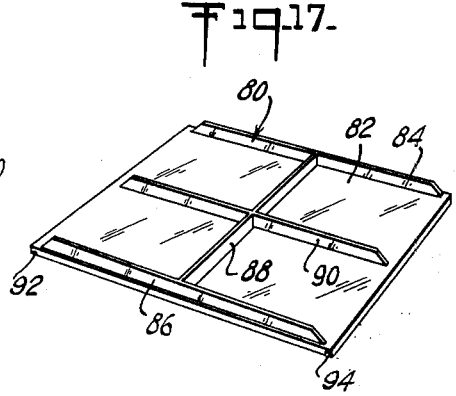
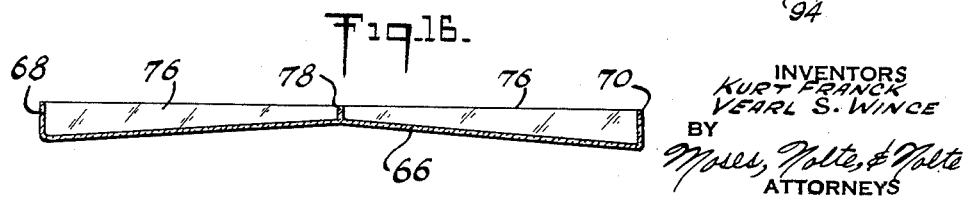
INVENTORS
KURT FRANCK
VEARL S. WINCE
BY
Moses, Nolte, & Nolte
ATTORNEYS

3,150,833
CEILING MOUNTED LIGHT REFRACTOR
Kurt Franck and Vearl S. Wince, Newark, Ohio, assignors to Holophane Company, Inc., New York, N.Y., a corporation of Delaware
Filed Nov. 27, 1959, Ser. No. 855,888
3 Claims. (Cl. 240—106)

This invention relates in general to light transmitters or lenses and in particular to a new and useful lightweight light transmitter member of plastic or similar material particularly adapted for ceiling lights and including means for strengthening the structure to permit it to be suspended from a ceiling and including improved light directing means thereon for insuring a beneficial distribution of light.

This application is a continuation-in-part of applicants' co-pending patent application Serial No. 645,315 filed March 11, 1957 and entitled "Ceiling Panel."

The present invention is particularly concerned with large-sized light transmitting panels or lenses which must be supported at their peripheries at spaced locations below lights arranged in a ceiling. With previous lens constructions for ceiling lighting, it was necessary to provide a great number of light obscuring supporting brackets at closely spaced locations in order to adequately support the lens structure. Such structures, of course, had the disadvantage that the ceiling lighting fixtures included many darkened areas at the location of the supporting brackets and caused a very poor light distribution.

In accordance with the present invention there is provided a substantially rectangular light transmitting panel or prism member which is advantageously made of a lightweight plastic to permit it to be supported by a widely spaced support for positioning below a ceiling light.

A feature of the present construction is that the panels are reinforced by stiffening flanges provided at the edges and by cross rib strengthening members intersecting the flanges. The light transmitting panel includes light directing prisms at the location of the stiffening flanges and stiffening ribs, the prisms being arranged to distribute light in useful directions beneath the transmitter and to deflect light which would normally be emitted at high glare angles. The light transmitting panel also includes an improved lens distribution which insures that some light will be redirected to the ceiling in order to insure that the ceiling area will not have any undesirable darkened portions.

Accordingly, it is an object of the invention to provide an improved light transmitting panel.

A further object of the invention is to provide an improved light transmitter made of lightweight material and particularly adapted for use in association with ceiling lights and in which the transmitter includes stiffening flanges and stiffening rib members arranged to permit the members to be suspended below a light in a ceiling without sagging, and including light directing prisms to insure that the light distribution below the member is even and at non-glaring angles.

A further object of the invention is to provide a lightweight plastic light transmitter having means for directing a portion of the light upwardly around the periphery thereof.

A further object of the invention is to provide a light transmitting structure which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 1 is a bottom perspective view of a pair of light transmitting members positioned together for support beneath a ceiling lighting structure;

FIG. 2 is a bottom plan view of the transmitters shown in FIG. 1 indicating one of the transmitters in solid lines and the other in dotted lines;

FIG. 3 is an enlarged fragmentary top plan taken along a corner area as indicated by the arrow 3 in FIG. 1;

FIG. 4 is a greatly enlarged bottom plan of the lens configuration of the area 4 indicated in FIG. 2;

FIG. 5 is an enlarged bottom plan indicating the detail of the prism configuration at the location of the area 5 of FIG. 2;

FIG. 6 is an enlarged bottom plan indicating the detail of the prism configuration of the area 6 as indicated in FIG. 2;

FIG. 7 is an enlarged bottom plan indicating the detail of the prism construction in the area 7 of FIG. 2;

FIG. 8 is an enlarged bottom plan indicating the detail of the prism construction in the area 8 of FIG. 2;

FIG. 9 is a vertical section taken on the line 9—9 of FIG. 7;

FIG. 10 is a vertical section taken on the line 10—10 of FIG. 8;

FIG. 11 is a fragmentary perspective view of one end of the light transmitter arranged below a fluorescent ceiling light;

FIG. 12 is a fragmentary section taken on the line 12—12 of FIG. 11;

FIG. 13 is a fragmentary vertical section taken on the line 13—13 of FIG. 6;

FIG. 14 is a fragmentary vertical section taken on the line 14—14 of FIG. 6;

FIG. 15 is a perspective view of another embodiment of the light transmitter;

FIG. 16 is a section taken on the line 16—16 of FIG. 15; and

FIG. 17 is a perspective view of another embodiment of the light transmitter.

FIG. 18 is a transverse section taken through a lighting fixture showing a light transmitter embodying the invention supported in a fixture.

Referring to the drawings in particular, the invention as embodied therein includes a light transmitter panel assembly generally designated 10 which may be advantageously formed, as indicated in the present embodiment, of two light transmitting members generally designated 12 and 14. Each of the light transmitting members advantageously includes a side stiffening flange construction 16 and 18 extending along the length of each side thereon. The light transmitting members 12 and 14 also include end stiffening flange constructions 20 and 22, which, in the embodiment shown, are arranged on the outboard side of each respective light transmitting member in order to permit assembly of the two members by abutting straight edge portions 24 together. It is intended that two of these units be used for each two-by-four foot wall opening. In many instances, where the ceiling space to be bridged by the light transmitter is sufficiently small, it is advantageous to use a single light transmitting member, such as 12, in which event an end stiffening flange construction similar to the construction 20 and 22 would be provided on each end of the light transmitting member.

In accordance with the invention, each of the light transmitting members 12 and 14 are advantageously made of a lightweight material, such as a translucent plastic. Since such materials are not usually rigid enough to be self sustaining, the present construction includes longitudinal stiffening members or ribs 26 and 28 formed on the top surface of each of the panel members 12 and 14, respectively. The ribs 26 and 28 are aligned when the panels are positioned in the assembly 10.

In addition to the longitudinal stiffening ribs 26 and 28 each of the light transmitting members 12 and 14 is provided with a cross stiffening rib, designated 30 for the light transmitting member 12 and 32 for the light transmitting member 14. The ribs 30 and 32 extend across the panels 12 and 14 and terminate at the side stiffening flange constructions 16 and 18. Ribs 30 and 32 intersect the longitudinal stiffening ribs 26 and 28, respectively.

In accordance with the invention, the side stiffening flange constructions 16 and 18 and 20 and 22 are substantially V-shaped in cross section (FIG. 9) and include a substantially vertical flange member 34, an inclined inner member 36 and a substantially horizontal bottom member 38 (see FIG. 9). The substantially vertical member 34 also includes a hooked top portion 40 along sides 16 and 18 to permit the light transmitting members 12 and 14 to be suspended on a ceiling channel support member (not shown) which fits under the hooked portion 40.

Besides the structural supporting and reinforcing function performed by the side and end stiffening flange constructions 16, 18, 20 and 22, these areas are also provided with light directing prisms to achieve very desirable light controlling functions. Since completely flush lighting units direct no light to the ceiling above the light transmitting members, objectionable light contrast occurs between the relatively dark ceiling and the bright lighting unit. This is overcome in accordance with the present invention by extending light controlling members, such as prisms, below the ceiling line so that some of the light can be directed back upwardly towards the ceiling. In accordance with the embodiment illustrated in FIGS. 1 to 14 of the invention, this is done by dropping the perimeter of the light controlling members below the ceiling line and leaving the greater area of the light transmitting members flush with or above the ceiling line. In the embodiment shown in FIGS. 15 and 16, on the other hand, the web of the light transmitter, which includes light directing prisms, is dropped on each side in order to present a convex surface directed upwardly towards the ceiling light.

In order to achieve the desirable light directing by the stiffening flange constructions, the vertical member 34 (FIGS. 3 and 9) is provided with rows of substantially vertical prisms 42 arranged along its inner face except in the areas within an inch or so of the end corners, where light diffusing flutes 42a are provided. The horizontal member 38 is provided with cut-off prism 44 on its lower outer face and the inclined inner member 36 is provided with diffusing flutes 46 on its outer face and similar diffusing flutes 48 on its inner face.

Referring to FIG. 9, light which is emitted from a light such as a fluorescent light 50 usually falls on the large surface area 52 of the web portion of the light transmitting members 12 and 14. Some of this light, such as light ray 54, is directed toward the horizontal member 38 where it is reflected by prism 44 and is emitted in an upward direction 54'. Most of the light, however, which strikes the member 38 continues on through it in slightly deviated directions but still generally downwardly as indicated at 54". A small amount of the light is scattered in all directions by the various surfaces of members 34, 36 and 38, and a certain amount of this scattered light is directed upwardly. This upwardly directed light, together with the light directed upwardly from the prism 44, is sufficient to provide a contrasting relieving glow around the light transmitter at the ceiling.

Some direct light, such as light ray 56, falls directly on the member 34 and is emitted through this member in directions generally crosswise of the unit. The light is diffused laterally by the prism 42 (FIG. 12) but is not deviated in vertical directions (FIG. 9). Other rays of light in the same vertical plane as ray 56, but directed in wide longitudinal directions as shown by ray 55 in FIGS. 11 and 12, would normally be emitted through the side 34 at undesirable high angle directions. However, prisms 42 reflect these high angle rays backwardly towards the portion 36 as indicated in FIG. 12.

Except for the areas below the stiffening members 26 and 28 and the ribs 30 and 32, the web or panel area 52 of the light transmitting members carry cut-off cone or pyramidal prisms 57 on its outer face.

In accordance with the invention, in the areas below the ribs, modified prisms 58 are provided. These are provided to eliminate the emission of light at high glare angles directly beneath the ribs and stiffening members.

Referring to FIG. 13, it can be seen that all light rays entering through flat surface 60 are confined by refraction within the material to a light cone having an angle of spread in all azimuths of 84° as indicated at A. On the other hand, the axis of the cone of entering rays through a surface 62 of stiffening rib 26 is at right angles to those entering surface 60. This results in rays from 48° to 90° vertically from the nadir as indicated at B. In those instances where cone prisms 57 are provided beneath the rib 26, light rays striking the cone prisms will be directed in useful directions as shown by the rays 59 and 59'. Higher rays, however, such as ray 61 which strikes the cones 58 will be emitted in unwanted high angle glare directions, such as indicated at 61'.

In order to correct the above and eliminate the high angle rays, such as 61', the portions immediately below the rib 26, as well as the portions below the rib 30 and the stiffening members 26 and 28, are provided with the modified prisms 58.

Since rays which strike the side of the rib 26, such as ray 64 (FIG. 13), are emitted in a direction 64' which is parallel to its entering direction, it is not necessary to provide redirecting prisms for such rays. By using the cut-off prisms 58, such as indicated in FIG. 14, high angle rays, such as those entering at the intersection of the surfaces 60 and 62 and the opposite side surfaces 60 and 62', will be reflected by the prisms 58 as shown by ray 66 and 66', while at the same time rays entering through the surface 60 and directed through prisms 58 will be emitted in below glare angle directions.

In the embodiment indicated in FIGS. 15 and 16, there is provided a light transmitting member including a curved web or panel 67 of substantially V-shaped cross section which is stiffened along each side by side flanges 68 and 70 and along each end by end flanges 72 and 74 all of which extend upwardly from the outer edges of the panel 67 and terminate in a common plane. The tops of the reinforcing end and side flanges 68 to 74 are normally positioned facing the light source in a ceiling. In order to provide additional stiffening for the panel portion 67 there are included cross ribs 76 and 78 which intersect at the center of the panel and which extend upwardly therefrom and terminate in the same horizontal plane as the upper edges of the flanges 68 to 74. In this embodiment the undersurface of the panel 67 is provided with light directing cone prisms (not shown) similar to the other embodiments except in the areas underlying the cross ribs 76 and 78 at which location the prisms are substantially as indicated at 58 in FIG. 6 of the drawings. The modified or cut-off prisms 58 are arranged on the face of the panel 67 beneath the ribs 76 and 78 as in the previous embodiment.

In FIG. 17 there is illustrated still another embodiment of the invention which includes a substantially flat light transmitting member generally designated 80 having a flat web portion 82, upstanding stiffening flanges 84 and 86 on each side and reinforcing cross ribs 88 and 90 which intersect at the center of the panels and divide the panel 82 into substantially equal portions. Each end of the panel is provided with downturned flange portions 92 and 94 provided to permit positioning of each end over an L-shaped supporting bracket (not shown). The panel 82 includes light directing prisms on its undersurface in the vicinity of the reinforcing ribs 88 and 90 which insure that light directed through the light transmitting member 82 at these locations does not exit at high glare angles.

FIG. 18 shows a peripherally strengthened refractor 100 supported at the juncture of its upstanding side walls 101 and its base upon the inwardly extending horizontal flanges of a ceiling fixture F which supports the linear light sources L above the refractor 100.

Thus, the invention provides a light transmitting member particularly adapted for use in association with ceiling lights including elongated light sources. Although the panels are advantageously made of a light-weight material, such as a plastic, they are provided with integral reinforcing members which insure that the panel will be held in a substantially rigid position beneath a ceiling light. In order to insure that the light which is directed by the transmitting member does not exit at high angle glares, the member is provided with light directing prisms beneath the strengthening rib portions to beneficially distribute the light in these areas.

The invention further includes means for directing a portion of the light against the surrounding ceiling area so that there will be no undesirable darkened areas of the ceiling immediately adjacent the lighting fixture.

While specific embodiments of the invention have been shown and described in detail to illustrate the application of the invention principles, it will be understood that the invention may be embodied otherwise without departing from such principles.

What is claimed is:

1. A substantially rectangular light transmitter for use below fluorescent lamps and made of plastic transparent material comprising an elongated light transmitting web having a light incident surface and a light emergent surface and at least one reinforcing rib extending between opposite edges of said web along said light incident surface of said web, and light directing means on said light emergent surface of said web in the vicinity of said reinforcing rib for altering the direction of light transmitted thereto through said rib at from 48° to 90° relative to nadir so as to obscure the fluorescent lamps and prevent glare.

2. A light transmitter for use with a fixture having a horizontally and inwardly extending flanged periphery and incorporating an elongated tubular light source comprising, a rigid tray of transparent sheet plastic material for substantially horizontal disposition beneath the light source said tray having a base and side walls of substantially the same thickness, the light emergent surface of said base being substantially covered with substantially similarly shaped, pyramidal apexed prismatic elements which alter the direction of light transmitted thereto at predetermined angles relative to nadir so as to obscure the tubular light source and prevent glare, and said side walls extending substantially vertically upwardly from the edges of said base, the under surface of said base at the juncture of said side walls and base along the periphery of said base constituting with the upper surface of the horizontally and inwardly flanged periphery of said fixture, the sole means for supporting said tray on the flanged periphery of the fixture.

3. A light transmitter for use in a ceiling lighting fixture below an elongated light source, comprising a substantially rectangular web lying in a first plane and having at least two opposite side edges formed into substantially discrete V-shaped cross-sections lying in planes at angles to said first plane of said web and substantially perpendicular to the planar extension of said web and providing stiffening flange areas on each side, and light directing prism means defined on the surfaces of said stiffening flange areas for directing a portion of light incident thereon upwardly and outwardly around the periphery of said light transmitting member and for illuminating said stiffening flange areas, said stiffening flange areas including a substantially vertical outer portion, a substantially horizontal bottom portion, and an inclined inner portion, said substantially vertical outer portion being provided with a plurality of rows of substantially vertical prism means for laterally diffusing light incident thereon, said substantially horizontal portion being provided with a plurality of rows of horizontal prism means for reflecting light incident thereon in upward directions and said inclined inner portion being provided with means for laterally diffusing light incident thereon.

References Cited in the file of this patent

UNITED STATES PATENTS

| | | |
|---|---|---|
| 804,254 | Mygatt | Nov. 14, 1905 |
| 2,772,742 | Sprankle | Dec. 4, 1956 |
| 2,817,752 | Florence | Dec. 24, 1957 |
| 2,833,916 | Foulds | May 6, 1958 |
| 2,850,110 | Benjamin | Sept. 2, 1958 |
| 2,887,568 | Franck | May 19, 1959 |
| 2,894,118 | Thallon | July 7, 1959 |

FOREIGN PATENTS

| | | |
|---|---|---|
| 712,575 | Great Britain | July 28, 1954 |
| 753,450 | Great Britain | July 25, 1956 |